(12) United States Patent
Mahadik et al.

(10) Patent No.: US 11,514,127 B2
(45) Date of Patent: Nov. 29, 2022

(54) MISSING WEB PAGE RELOCATION

(71) Applicant: INTERNATIONAL BUSINESS MACHINES CORPORATION, Armonk, NY (US)

(72) Inventors: Vineet P. Mahadik, Round Rock, TX (US); Frank Isaacs, Wake Forest, NC (US); Ashley Kristin Silva, Durham, NC (US); Randy A Rendahl, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 16/282,381

(22) Filed: Feb. 22, 2019

(65) Prior Publication Data

US 2020/0272679 A1 Aug. 27, 2020

(51) Int. Cl.
*G06F 16/955* (2019.01)
*G06F 16/338* (2019.01)
*G06F 16/9538* (2019.01)
*G06F 40/205* (2020.01)

(52) U.S. Cl.
CPC ........ *G06F 16/9566* (2019.01); *G06F 16/338* (2019.01); *G06F 16/9538* (2019.01); *G06F 40/205* (2020.01)

(58) Field of Classification Search
CPC ......... G06F 16/95–986; G06F 16/9566; G06F 3/048; G06F 16/955–9566; G06F 16/9538; G06F 16/338; G06F 40/205–226; G06F 40/20–295; G06F 16/951; G06F 9/44521

See application file for complete search history.

(56) References Cited

U.S. PATENT DOCUMENTS

| | | | | |
|---|---|---|---|---|
| 6,928,429 | B2 * | 8/2005 | Brunssen | G06F 16/951 |
| 7,028,031 | B1 * | 4/2006 | Rehfeld | G06F 16/9558 |
| 7,080,073 | B1 * | 7/2006 | Jiang | G06F 40/131 |
| 7,769,742 | B1 * | 8/2010 | Brawer | G06F 16/951 |
| | | | | 707/709 |
| 7,853,719 | B1 * | 12/2010 | Cao | G06F 16/9566 |
| | | | | 709/245 |
| 8,671,108 | B2 | 3/2014 | Kondasani | |
| 8,706,909 | B1 * | 4/2014 | Nickson | H04L 67/02 |
| | | | | 709/245 |
| 8,751,601 | B2 | 6/2014 | Edge | |

(Continued)

OTHER PUBLICATIONS

Kumar, Lalit."How to Solve This Webpage Has a Redirect Loop Problem". Techwelkin. Sep. 22, 2017. https://techwelkin.com/how-to-solve-this-webpage-has-a-redirect-loop-problem (Year: 2017).*

(Continued)

*Primary Examiner* — Liang Y Li
(74) *Attorney, Agent, or Firm* — Douglas Crockatt

(57) ABSTRACT

Utilizing a computing device to automatically locate a link to a target web page whose link from a referring web page is broken. A computing device receives a request to access a link to a target web page from a referring web page. The computing device receives a notification indicating that the link to the target web page is broken. The computing device locates a new link to the target web page utilizing one or more keywords. The computing device provides access to the target web page.

14 Claims, 5 Drawing Sheets

(56) References Cited

U.S. PATENT DOCUMENTS

| | | | |
|---|---|---|---|
| 9,584,580 B2 | 2/2017 | Brundage | |
| 9,792,382 B2 | 10/2017 | Sadri | |
| 10,430,478 B1* | 10/2019 | Blalock | G06F 16/9535 |
| 2003/0158953 A1* | 8/2003 | Lal | H04L 29/06 |
| | | | 709/230 |
| 2004/0030683 A1* | 2/2004 | Evans | G06F 16/951 |
| 2008/0263193 A1* | 10/2008 | Chalemin | H04L 67/02 |
| | | | 709/224 |
| 2010/0131588 A1 | 5/2010 | Loftus | |
| 2012/0259832 A1* | 10/2012 | Walker | G06F 16/9566 |
| | | | 707/709 |
| 2016/0292207 A1* | 10/2016 | Watanabe | G06F 40/197 |

OTHER PUBLICATIONS

Mueller, John. "FYI in Google Toolbar's latest features". Google. Dec. 14, 2007. https://webmasters.googleblog.com/2007/12/fyi-on-google-toolbars-latest-features.html (Year: 2007).*

Thomas, Machielle. The Importance of Internal Links for your Word Press Website. Feb. 19, 2019. Bluehost.com <https://www.bluehost.com/blog/the-importance-of-internal-links-for-your-wordpress-website> (Year: 2019).*

Hayat, Shoaib, Yue Li, and Muhammad Riaz. "Automatic recovery of broken links using information retrieval techniques." Proceedings of the 2nd International Conference on Natural Language Processing and Information Retrieval. 2018. (Year: 2018).*

Klein, Martin, and Michael L. Nelson. "Revisiting lexical signatures to (re-) discover web pages." International Conference on Theory and Practice of Digital Libraries. Springer, Berlin, Heidelberg, 2008. (Year: 2008).*

Klein, Martin, and Michael L. Nelson. "Evaluating methods to rediscover missing web pages from the web infrastructure." Proceedings of the 10th annual joint conference on Digital libraries. 2010. (Year: 2010).* https://growthrobotics.com/7-tools-will-help-find-duplicate-content-website/, "7 Tools That Will Help You Find Duplicate Content on My Website", Nov. 17, 2017, pp. 1-15.

https://archive.org/web/, "Wayback Machine", printed Dec. 10, 2018, pp. 1-2.

Google, "Cache", http://webcache.googleusercontent.com/search?q=cache, printed Dec. 10, 2018, pp. 1-3.

https://www.screamingfrog.co.uk/seo-spider/, "Screaming Frog", Screaming Frog SEO Spider Tool and Crawler Software, printed Dec. 10, 2018, pp. 1-15.

Mell et al., "The NIST Definition of Cloud Computing", National Institute of Standards and Technology, Special Publication 800-145, Sep. 2011, pp. 1-7.

Merchant, "How to Use Intelligent 404 Pages to Stop Losing Customers", https://www.impactbnd.com/blog/intelligent-404-pages, May 2, 2018, pp. 1-5.

* cited by examiner

MISSING WEB PAGE RELOCATION

BACKGROUND

The present invention relates generally to the field of web pages, and more particularly to the relocation of web pages for which the referring page has a link which is invalid for one or more reasons.

BRIEF SUMMARY

Embodiments of the present invention disclose a method, system, and computer program product for utilizing a computing device to automatically locate a link to a target web page whose link from a referring web page is broken. A computing device receives a request to access a link to a target web page from a referring web page. The computing device receives a notification indicating that the link to the target web page is broken. The computing device locates a new link to the target web page utilizing one or more keywords. The computing device provides access to the target web page.

DETAILED DESCRIPTION

A common occurrence during browsing the internet is to be presented with a so-called "HTTP 404," a "404 Not Found," or a "404 error message" in response to selecting a link to a target web page from a referring web page which no longer available. An HTTP 404 response is a standard HTTP status code which indicates the page is not available to be displayed on an web browser or is otherwise unavailable. Each HTTP 404 may occur for one or more different reasons, including but not limited to: the link to the target web page has changed without explicit redirect instructions; the link has expired; the link been taken down (and redirect instructions have not been provided on a web server associated with the referring web page); the referring web page and target web page have been reorganized; the link to the target web page requires a number of redirects greater than allowed by the web browser being used. As the internet ages, and is increasingly large and voluminous, the number of HTTP 404 responses received may be expected to increase, frustrating attempts to efficiently access data and other resources available via the internet. Presented are a method, a system, and a computer program product for missing web page relocation in an automated fashion, in response to HTTP 404 responses, any other HTTP responses indicating a web page is no longer available, and that web pages are unavailable for any other reason.

Figure 1:
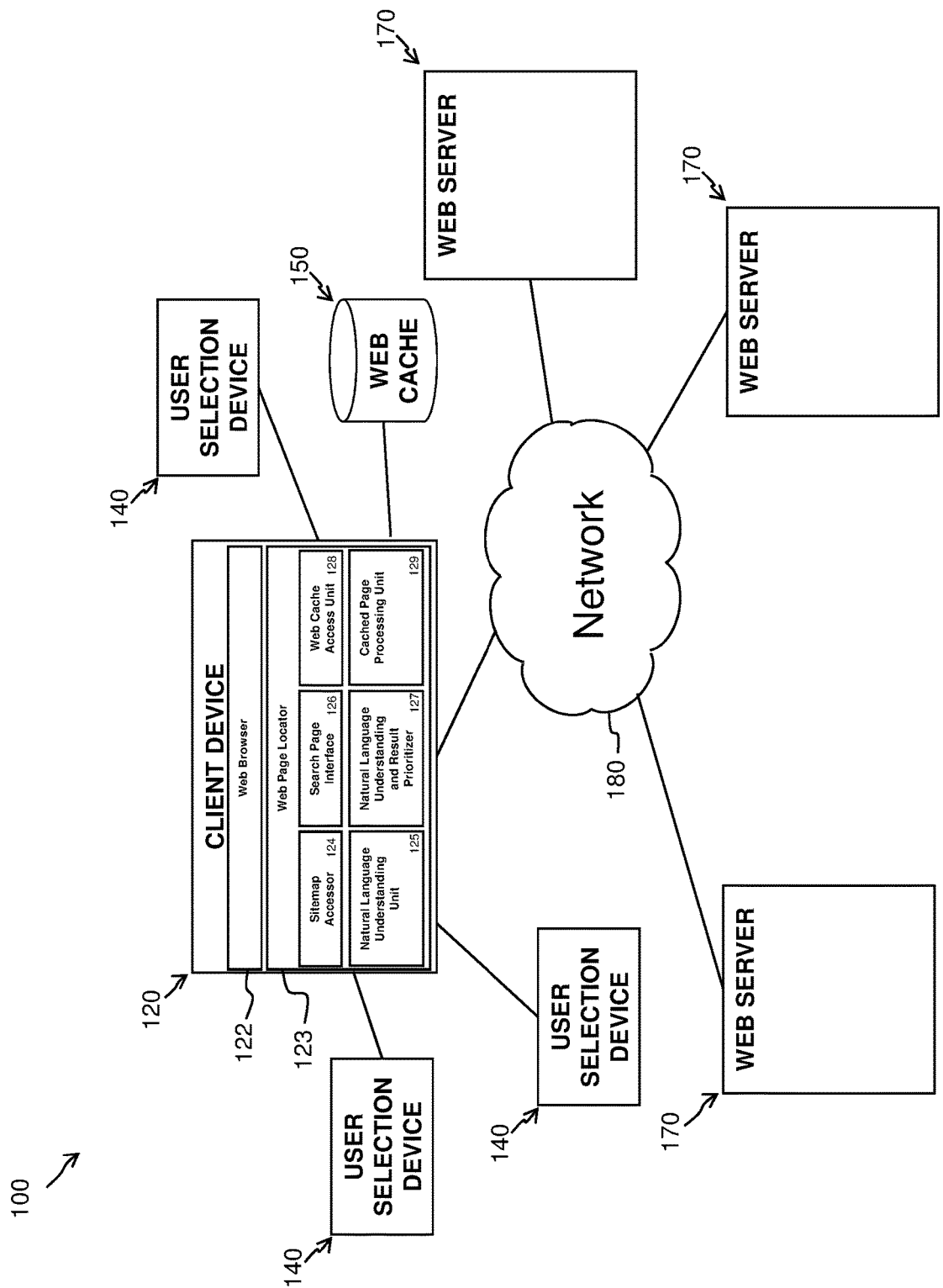
FIG. 1 is a functional block diagram illustrating an environment for missing web page relocation, in accordance with an embodiment of the present invention.

FIG. 1 is a functional block diagram illustrating an environment 100 for missing web page relocation, in accordance with an embodiment of the present invention. In an exemplary embodiment, a client device 120 attempts to access one or more web pages via network 180, the one or more web pages hosted at one or more web server(s) 170 ("web pages," as used herein, including internet pages, resources, internet programs, or any other computerized resource available via network 180). After receiving a request from client device 120, web server(s) 170 determines whether the requested web page is available, and eithers transmits the requested web page (if it is available), or transmits one or more HTTP status code(s) to indicate the web page is not available (including, but not limited to a 404 Not Found Message, a 401 Unauthorized Message, a 403 Forbidden Message, a 410 Gone Message, any other HTTP Status Code, or the presently-existing or after-arising equivalent of any of these indicating the web page is not available or sufficient permission does not exist for transmission or access by the client device 120) (collectively herein, a "page not available message(s)"). As is further discussed herein, the presently disclosed invention is utilized to automatically locate the requested web page if the web page is not available. In various embodiments of the invention, one or more user selection device(s) 140 and/or a web cache 150 may be present in the environment 100. User selection device(s) 140 allows user to provide input and to make various selections at client device 120, such as typing the address of a website for viewing, clicking on a link to access a web page (which may or may not be available, as further discussed herein), and selecting via a link whether or not to utilize the presently disclosed invention if a page not available message is received. User selection device(s) 140 may be, as displayed in connection with FIG. 3, in various embodiments of the invention a computer mouse or touchpad 924, a keyboard 922, and/or any other computerized input device. Web cache 150, if present in the embodiment of the invention, is any sort of web storage device capable of storing cached versions of web pages, i.e. those that were previously downloaded by client device 120. Cached versions of web pages are utilized as further discussed herein, in the operation of the presently disclosed invention.

Client device 120 and web server(s) 170 are connected via network 180. In various embodiments of the invention, network 180 represents, for example, an Internet, a local area network (LAN), a wide area network (WAN) such as the Internet, and includes wired, wireless, or fiber optic connections. In general, network 180 may be any combination of connections and protocols that will support communications between client device 120 and web server(s) 170.

In various embodiments of the invention, client device 120 and web server(s) 170 may be, by means of non-limiting example, a mainframe or a mini computer, a terminal, a laptop, a tablet, a netbook personal computer (PC), a mobile device, a desktop computer, or any other sort of computing device, in accordance with embodiments described herein. Client device 120 and web server(s) 170 may include internal and external hardware components as depicted and described further in detail with reference to FIG. 3, below. In other embodiments, each of client device 120 and web server(s) 170 may be implemented in a cloud computing environment, as described in relation to FIGS. 4 and 5, below. In a still further embodiment, some or all of client device 120 and web server(s) 170 are embodied in physically the same computing device, with all communications between various components made internally.

Client device 120 and web server(s) 170, in effect, represent any sort of computing device possessing sufficient processing power to execute software and/or hardware for missing web page relocation, in accordance with an embodiment of the invention. Computing devices associated with client device 120 and web server(s) 170 may utilize a hosted workload 96 as displayed in connection with FIG. 5 below, and/or perform other tasks as further described herein.

In the exemplary embodiment, client device 120 includes an web browser 122 and a web page locator 123. In various embodiments of the invention, web page locator 123 comprises one or more of a sitemap accessor 124, a natural language understanding unit 125, a search page interface 126, a natural language understanding and result prioritizer 127, a web cache access unit 128, and a cached page processing unit 129. In various embodiments of the invention, client device 120 may be operatively connected to a user selection device 140 and/or a web cache 150. The operative connection(s) between the user selection device 140 and/or the web cache 150 may be a wired or wireless direct connection or via network 180.

Web browser 122 represents software executing at least in-part on client device 120 for accessing and displaying web pages accessed from web server(s) 170 via network 180. As discussed elsewhere herein, web pages may include internet pages, databases, internet programs, and/or any other sort of remote computerized resources available via network 180 at web server(s) 170. Web browser 122 also provides to user or to automated software functionality for making selections with regard to the web pages (including internet pages, databases, internet programs, and/or), and perform other functionality as further discussed herein. Web browser 122 may, in various embodiments of the invention, be Microsoft® Internet Explorer®, Mozilla® Firefox®, Google Chrome™, or any presently existing or after-arising software and/or hardware allowing the user to access web server(s) 170, select web pages, view web pages, download web pages, make selections within web pages, etc. as further discussed herein. During execution of an embodiment of the invention, web browser 122 receives a request from a user utilizing one or more user selection device(s) 140, and/or an automated request originating from software and/or hardware to access a link to a target web page. The target web page may be (or been in the past) hosted at one or more web server(s) 170. The target web page is linked to from a referring web page being accessed or displayed by web browser 122. The link to the target web page may be a hyperlink, for selection (HTML or otherwise). The request may, in various embodiments of the invention, take the form of clicking a link to the target web page within the referring web page, an automated timer-based selection of a link, or otherwise. In situations where the link is "broken" or, in effect no longer links to the web page requested, web browser 122 also serves, in various embodiments of the invention, to receive and display a notification the link to the target web page is broken, such as a HTTP 404 message, or other "page not available message" as further discussed herein. Web browser 122, in these circumstances, may in various embodiments of the invention, offer a user an option to automatically locate the broken link as further discussed herein, such as via a pop-up window, or by presentation of a second hyperlink for selection by the user. After receiving an affirmative response from the user, such as by selection of the pop-up window, or selection of the second hyperlink, execution of the presently disclosed invention automatically locates the link to the target web page, as further discussed herein. Web browser 122 then provides access to the target web page, or provides an alternative hyperlink for selection by the user.

Web page locator 123 represents software and/or hardware executing at least in-part on client device 120 to automatically locate and present a link to a target page, when the link from the referring web page to the target web page is "broken" or, in effect, does not work. Web page locator 123 may be implemented as a plug-in to web browser 122, as a stand-alone program executing on client device 120, and/or, in alternative embodiments of the invention, as a program executing at least in-part on web server(s) 170, or in another remote location. In various embodiments of the invention, web page locator 123 includes one or more of sitemap accessor 124, natural language understanding unit 125, search page interface 126, natural language understanding and result prioritization 127, web cache access unit 128, and/or cached page processing unit 129. After receipt of notification the link to the target web page is broken such as an HTTP 404 message (or otherwise, as discussed herein), in various embodiments of the invention web page locator 123 may be executed automatically or after an affirmative response from the user (as discussed elsewhere herein), in order to automatically locate a new link to the target web page, utilizing various functionality as further discussed herein.

Sitemap accessor 124 of web page locator 123 represents software and/or hardware to access a sitemap of a referring web page to be utilized in relocation of target web pages, if one is present. After receiving notification that the link to the target web page is broken, sitemap accessor 124 may determine whether a sitemap for the site hosting the referring web page has been provided by a designer of the referring web page (or available elsewhere via network 180, or locally to client device 120), and, if so, sitemap accessor 124 accesses the sitemap. Each sitemap, if present, provides a list of pages available (or previously available) on the web server 170. Sitemaps may be provided in XML, Flash, or a presently-existing or after-arising computer language (or the equivalent) providing a listing of pages available locally or remotely. The sitemaps may be structured or unstructured in nature. When sitemap accessor 124 is utilized, sitemap accessor 124 operates to automatically traverse one or more destination web pages listed in the sitemap, as further discussed below, and parses text as well as, in various embodiments of the invention, other weblinks contained within the referring web page, audio, video, and/or any other digitized content available in the web pages in the form of "keywords" for further utilization as discussed herein. In an embodiment of the invention, keywords may also be parsed from metadata for each destination web page listed in the sitemap. Keywords may be stored in any of variables, objects, arrays, linked-lists, or any computer-available form maintaining information regarding the origin and other details of each web page. Results of traversing the web pages are provided by sitemap accessor 124 to natural language understanding unit 125 to be utilized in locating the new link to the target web page, as further discussed herein. In a further embodiment of the invention, sitemap accessor 124 also scans one or more further destination web pages linked-to from the traversed one or more web pages listed in the sitemap, traverses automatically the one or more further destination web pages scanned, and parses text, audio, video, other digitized content, metadata, etc. from the one or more further destination web pages and parses one or more "new keywords" from further destination web pages. The results of traversing the further web pages are also provided by sitemap accessor 124 to natural language understanding unit 125 to be utilized in locating the new link to the target web page, with the process utilized in order to further expand the globe of results provided by the presently disclosed invention. Sitemap accessor 124 may further retrieve one or more new sitemaps from the further linked-to web pages and further utilize the one or more sitemaps to locate the new link to the web pages, by continuing to utilize the above and below-described processes.

Natural language understanding unit 125 of web page locator 123 represents software and/or hardware to operate in conjunction with sitemap accessor 124 to compare parsed "keywords" (and/or parsed "new keywords") with an accessed page name for the target web page, in locating a new link to the target web page, in an embodiment of the invention. In the embodiment of the invention, after sitemap accessor 124 traverses one or more destination web pages and/or further destination web pages, natural language understanding unit 125 accesses a page name for the target web page, and compares the page name for the target web page with the parsed keywords to locate the new link to the target web page. In an embodiment of the invention, the target page name is available from the sitemap for the site hosting the referring web page (or elsewhere, as further discussed herein), and is obtained automatically by the natural language understanding unit 125. The target page name may also be stored in any other computerized form available for utilization by natural language understanding unit 125, and simply accessed by natural language understanding unit 125. In a further embodiment, natural language understanding unit 125 obtains a title, and/or filename from cached page processing unit 129 (or, links, keywords, metadata, images, video, audio, dates, tags, etc.) from each cached web page, as further discussed below. Natural language understanding unit 125 may utilize artificial intelligence, a best-fit analysis, cognitive computing, or any other computerized means of comparison of the target page name and the parsed keywords to determine the new link to the target web page. In other embodiments of the invention, natural language understanding unit 127 may provide one suggested new link among multiple new links suggested by other functionality of web page locator 123, which a user may select between or are automatically ranked by web page locater 123 and provided. In still other embodiments of the invention, natural language processing unit 125 may alternately or in combination consider links, keywords, metadata, images, video, audio, dates, tags, etc. obtained from cached page processing unit 129 in locating the new link to the web page.

Search page interface 126 of web page locator 123 represents software and/or hardware to access a search page, search application programming interface, or other search facility (collectively herein, a "search page") of a referring web page to be utilized in relocation of target web pages, if one is present. After receiving notification the link to the target web page is broken, sitemap accessor 124 determines whether a search page for the site hosting the referring web page has been provided by a designer of the referring web page, and, if so, search page interface 126 of web page locator 123 accesses the search page for the referring web page in order to confirm it is present, confirm what type of search data it utilizes, etc. Each search page, if present, provides functionality for searching all web pages linked-to or available in any way from the referring web page, to provide a user-friendly and fast means of locating a target web page. Search pages may be powered by a search engine hosted locally or remotely to web server 170, and utilize natural language, any sort of unstructured data, structured data, a url-based search, images, audio, metadata, or any other means of locating a target web page from the referring web page. As discussed previously, in alternative embodiments of the invention, a search application programming interface which is directly accessed by search page interface 126, or other, equivalent search facility may be utilized. When search page interface 126 is utilized, search page interface 126 operates to automatically submit natural language, structured data, unstructured data, etc. to the search page in obtaining the results of the search function. Search page interface 126, in an embodiment of the invention, may access a page name of the web page (from locations as discussed above in connection with the natural language understanding unit 125), and automatically submit the page name to the search page. Search page automatically generates results and provides them to natural language processing and result prioritizer 127, to be utilized as further discussed below.

Natural language processing and result prioritizer 127 represents software and/or hardware for receiving results generated by the search page, and prioritizing the results of the search according to various criteria, in various embodiments of the invention, in order to provide to user or automated software the web page which is most likely to link to the web page with the broken link. In various embodiments of the invention, natural language processing and result prioritizer 127 may parse one or more keywords, metadata, images, audio, video, etc. from the results generated by the search page, with the keywords, metadata, audio, video, etc. taken from each resulting web page, and comparing one or more of these with a title, keywords, metadata, audio, video, etc. obtained regarding the target web page, in prioritizing the results.

Web cache access unit 128 represents software and/or hardware executing locally to client device 120 and/or remotely to access cached versions of web pages from web cache 150. Web cache access unit 128 may be part of web browser 122 and stored on secondary storage associated with client device 120. Alternatively, web cache access unit 128 may be implemented as a plug-in to web browser 122 executing on client device 120 or independently executing software executing on client device 120 or elsewhere. Web cache access unit 128 serves to store and/or provide access to previous versions of various web pages, including one or more target web pages. If a previous version of a target web page is requested by any functionality such as described herein, one or more cached web pages are made available for further utilization as discussed herein, such as to cached page processing unit 129.

Cached page processing unit 129 represents software and/or hardware for receiving cached web pages accessed by web cache access unit 128, and processing a title, links, keywords, metadata, images, video, audio, dates, tags, etc. from each cached web page for further utilization as discussed herein. In an embodiment of the invention, the title, links, keywords, metadata, images, video, audio, dates, tags, etc. are provided to other functionality as further discussed herein, such as to sitemap accessor 124 and/or search page interface 126 for further utilization in locating a broken link, etc.

User selection device 140 represents software and/or hardware present in environment 100 to allow user to provide input and make various selections at client device 120, such as typing the address of a website for viewing, clicking on a link to access a web page (which may or may not be available, as further discussed herein). In alternative embodiments of the invention, user selection device 140 may also provide functionality for a user to select a link whether or not to utilize the presently disclosed invention if a target page is not available. User selection device(s) 140 may be, as displayed in connection with FIG. 3, in various embodiments of the invention be a computer mouse or touchpad 924, a keyboard 922, and/or any other computerized input device.

Web cache 150 represents software and/or hardware for storing of previous versions of web pages which are not currently available. Web cache 150 may be local to client device 120, remote to client device but directly connected to client device 120, or connected via network 180. Web cache 150 may be primary storage, secondary storage, or comprise any other sort of storage device.

Web server(s) 170 represents software and/or hardware for hosting the referring web page, the target web page, and/or other web pages as described herein. Hardware associated with web server(s) 170 is any which allows for the storage of web pages, servicing of request for web pages from client device 120, provide page not available message(s) if the pages are not available (as further discussed herein), links are bad, etc. Web server(s) may also comprise software and hardware to transmit all data to client device 120, as further discussed herein. Web server(s) 130 may additionally or in the alternate contain other functionality, as discussed by one of skill in the art.

Figure 2:
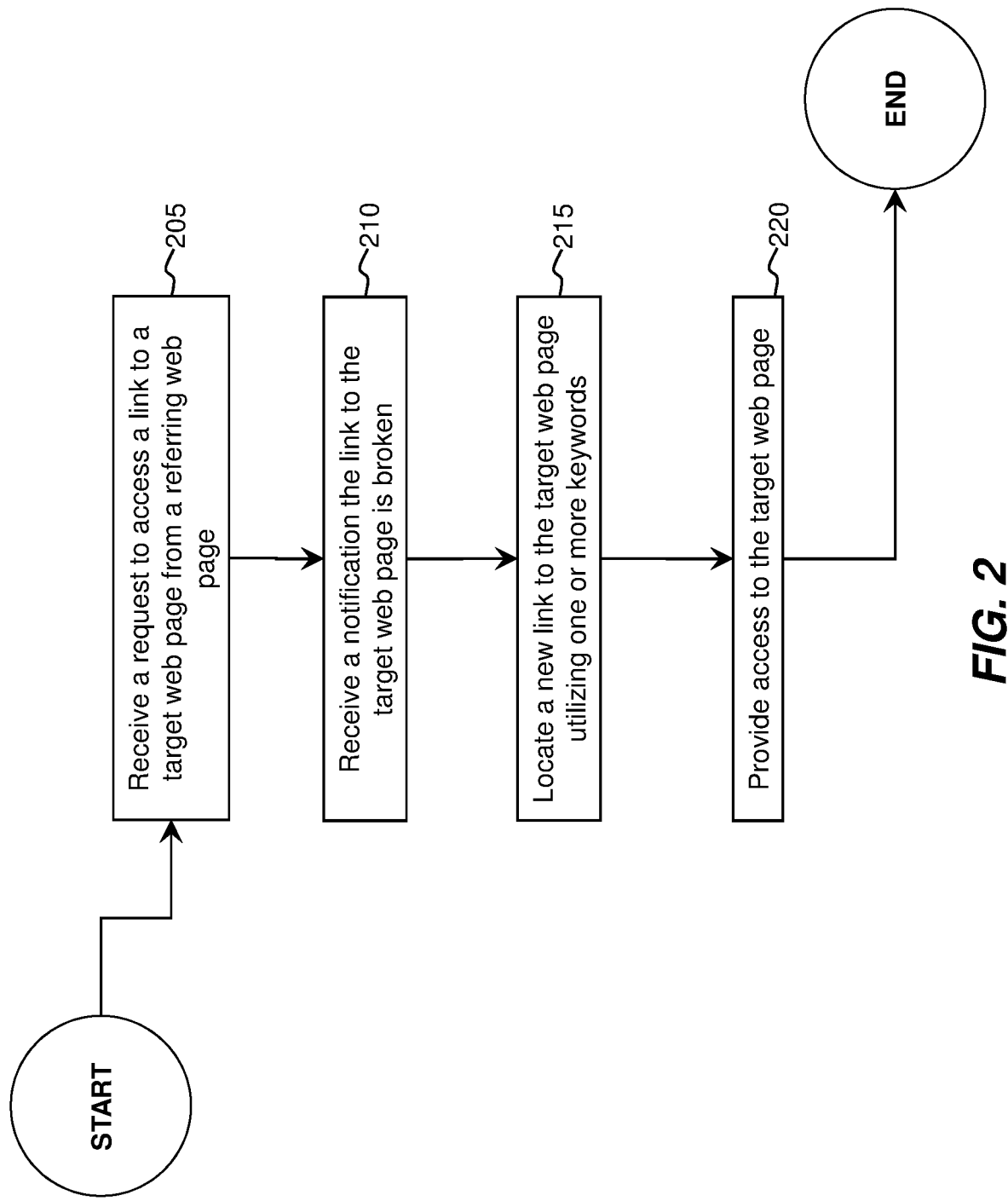
FIG. 2 is a flowchart depicting operation steps that a hardware component, multiple hardware components, and/ or a hardware appliance may execute, in accordance with an embodiment of the invention.

FIG. 2 is a flowchart depicting operational steps that a hardware component, multiple hardware components, and/or a hardware appliance may execute, in accordance with an embodiment of the invention. At step 205, a request to access a link to a target web page from a referring web page is received at client device 120. The request may result from automated software attempting to access the target web page, or from user selection device 140. At step 210, a notification the web link is broken is received by client device 120, in the form of a "page not available message" as further discussed herein. The "page not available" message is transmitted from web server 170 to client device 120, and may be displayed to a user at client device 120. As is discussed further herein, at step 215 client device 120 uses a variety of different functionality of web page locator 123 to locate a new link to the target web page utilizing one or more keywords, or, in alternate embodiments of the invention, comparison of weblinks contained within the referring web page, audio, video, and/or any other digitized content. At step 220, client device 120 provides access to the target web page to the user or automated software which has requested access (such as via web browser 122, or otherwise).

Figure 3:
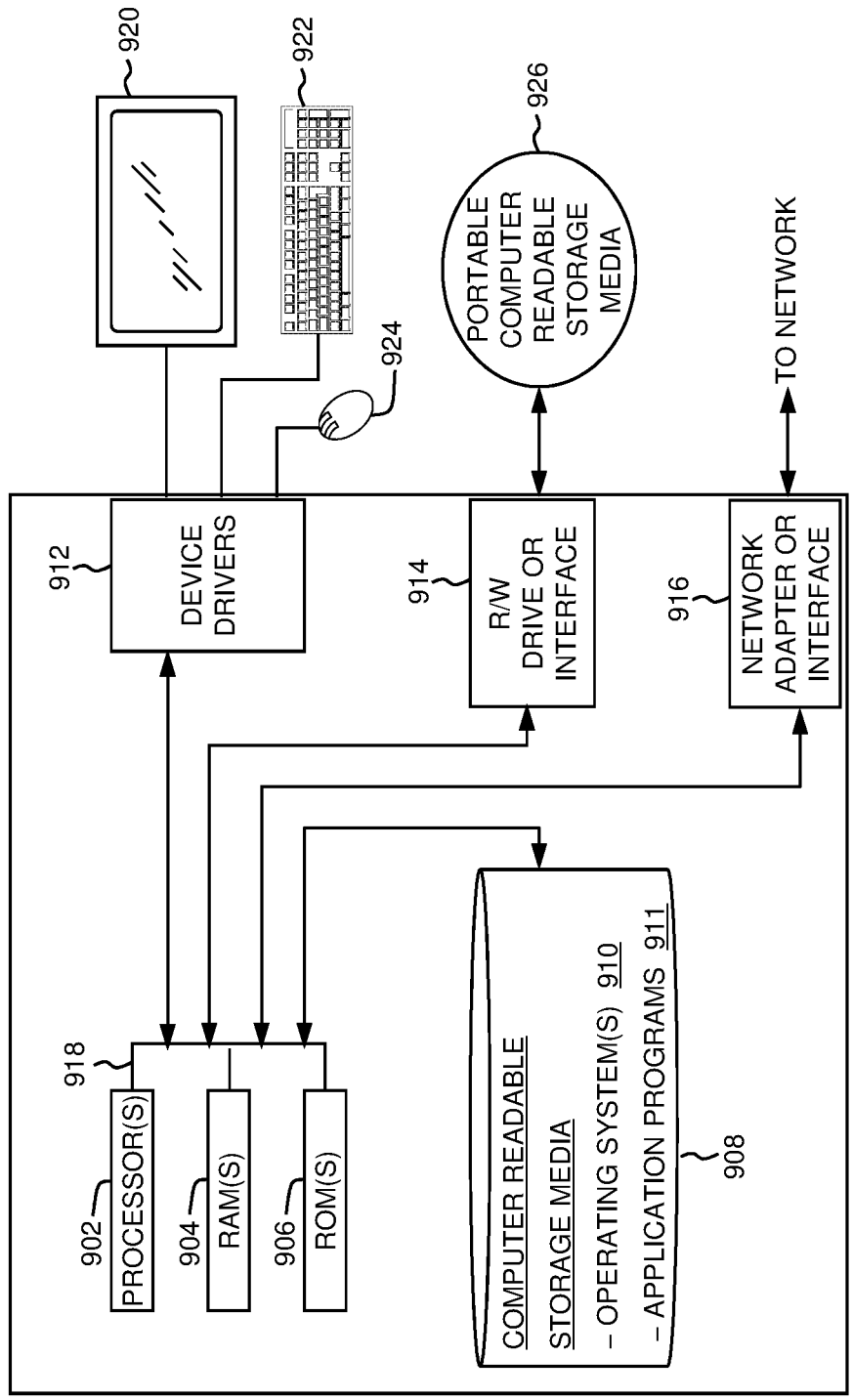
FIG. 3 depicts a block diagram of components of client device 120 and/or web server(s) 170 of FIG. 1, in accordance with an embodiment of the present invention.

FIG. 3 depicts a block diagram of components of client device 120 and web server(s) 170 in the environment 100 for missing web page relocation, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Client device 120 and web server(s) 170 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment 100 for missing web page relocation, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client device 120 and web server(s) 170 may also include a R/W drive or interface 914 to read from and write to one or more portable computer readable storage media 926. Application programs 911 on client device 120 and web server(s) may be stored on one or more of the portable computer readable storage media 926, read via the respective R/W drive or interface 914 and loaded into the respective computer readable storage media 908.

Client device 120 and web server(s) 170 may also include a network adapter or interface 916, such as a TCP/IP adapter card or wireless communication adapter (such as a 4G wireless communication adapter using OFDMA technology). Application programs 911 on client device 120 and web server(s) 170 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Client device 120 and web server(s) 170 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, VLANs, virtual networks, virtual machines, computing containers, cloud-connected components, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a virtual network, a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
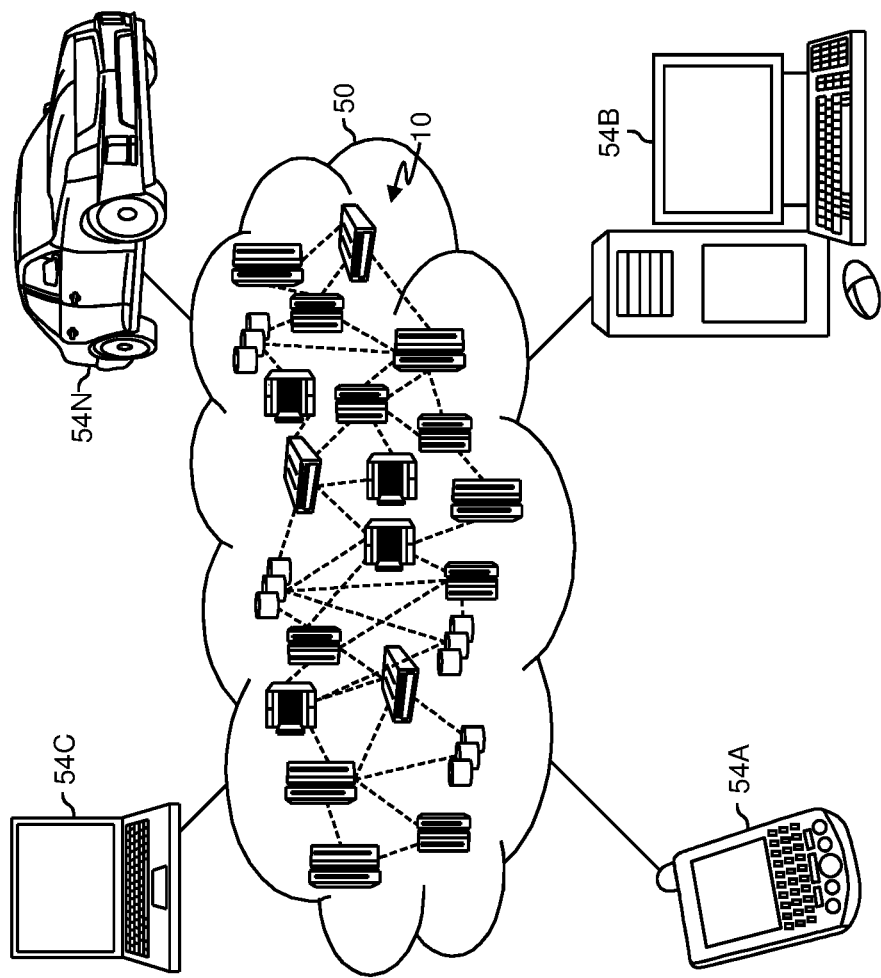
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
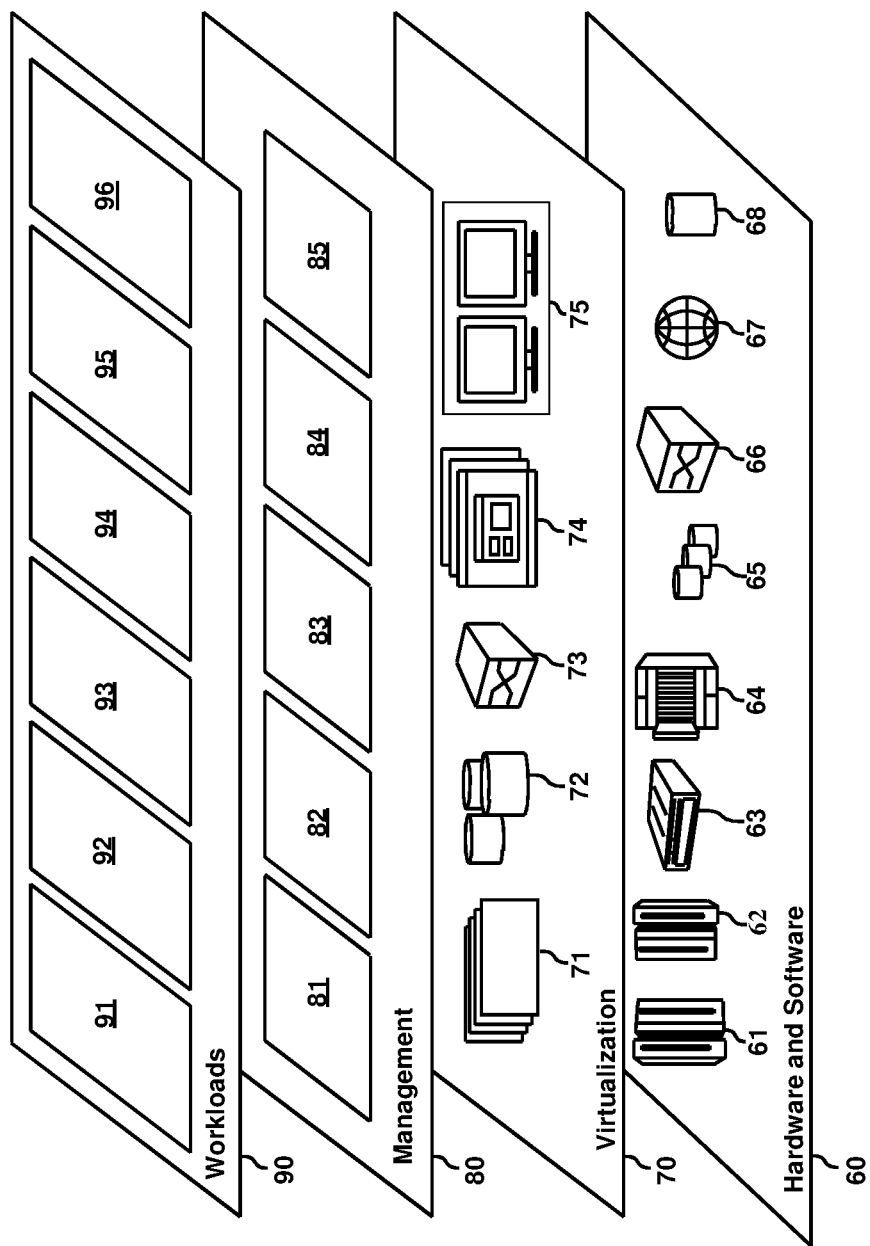
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment 100 for missing web page relocation.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of utilizing a computing device to automatically locate a link to a target web page whose link from a referring web page is broken, the method comprising:
    receiving via a user input at a computing device a request to access a link to a target web page, wherein the link is from a referring web page being displayed to the user of the computing device;
    in response to attempting to access the target web page, receiving by the computing device a notification that the link to the target web page is broken;
    based on receiving the notification that the link to the target web page is broken:
    determining by the computing device whether a search page for a site hosting the referring web page is present;
    accessing by the computing device a site map for the site hosting the referring web page, the sitemap providing a list of pages available or previously available on a web server hosting the site;
    traversing, by the computing device, one or more pages listed in the sitemap;
    scanning, by the computing device, automatically for one or more further destination web pages linked-to from the traversed one or more web pages listed in the sitemap, the one or more further destination web pages not listed in the site map;
    traversing, by the computing device, automatically the one or more further destination web pages scanned and parsing one or more new keywords from the one or more further destination web pages;
    accessing by the computing device a page name for the target web page;
    comparing, by the computing device, the parsed one or more new keywords from the further destination web pages with the accessed page name to locate a new link to the web page, the comparing performed by comparing the one or more parsed new keywords with the retrieved page name using a best-fit analysis;
    generating, by the computing device, a list of prioritized results via the best-fit analysis; and
    providing access via the computing device to the user of the computing device to the result which is most likely to link to the broken target web page of the prioritized results located via the best-fit analysis.

2. The method of claim 1, wherein the parsed one or more new keywords are parsed from meta data for the traversed one or more further destination web pages.

3. The method of claim 1, further comprising:
    retrieving one or more new sitemaps from the traversed one or more further destination web pages; and
    utilizing the one or more new sitemaps to locate the new link to the web page.

4. The method of claim 1, wherein the results do not include one or more web pages if links to the web pages are broken.

5. The method of claim 4, wherein the computing device automatically determines whether links to one or more web pages are broken.

6. The method of claim 1, wherein the notification that the link to the target web page is broken occurs because redirect instructions to the target web page have expired.

7. The method of claim 1, wherein the notification that the link to the target web page is broken occurs because the redirect instructions require a number of hops not permitted.

8. The method of claim 1, wherein previous to locating by the computing device the new link to the target web page presenting to the user an option to automatically locate the link and receiving an affirmative response from the user.

9. The method of claim 1, wherein the page name for the target web page is available from a sitemap for the referring web page.

10. The method of claim 1, wherein the page name is available from a cached version of the target web page available via a web cache.

11. A computer program product utilizing a computing device to automatically locate a link to a target web page whose link from a referring web page is broken, the computer program product comprising:
    one or more non-transitory computer-readable storage media and program instructions stored on the one or more non-transitory computer-readable storage media, the program instructions, when executed by the computing device, cause the computing device to perform a method comprising:
    receiving via a user input at a computing device a request to access a link to a target web page, wherein the link is from a referring web page being displayed to the user of the computing device;
    in response to attempting to access the target web page, receiving by the computing device a notification that the link to the target web page is broken;
    based on receiving the notification that the link to the target web page is broken:
    determining by the computing device whether a search page for a site hosting the referring web page is present;
    accessing, by the computing device, a sitemap for the site hosting the target web page, the sitemap providing a list of pages available or previously available on a web server hosting the site;
    traversing, by the computing device, one or more pages listed in the sitemap;
    scanning, by the computing device, automatically for one or more further destination web pages linked-to from the traversed one or more web pages listed in the sitemap, the one or more further destination web pages not listed in the site map;

traversing, by the computing device, automatically the one or more further destination web pages scanned and parsing one or more new keywords from the one or more further destination web pages;

accessing, by the computing device, a page name for the target web page;

comparing, by the computing device, the parsed one or more new keywords from the further destination web pages with the accessed page name to locate the new link to the web page, the comparing performed by comparing the one or more parsed new keywords with the retrieved page name using a best-fit analysis;

generating, by the computing device, a list of prioritized results via the best-fit analysis; and providing access via the computing device to the user of the computing device to the result which is most likely to link to the broken target web page of the prioritized results located via the best-fit analysis.

12. The computer program product of claim 11, wherein the parsed one or more new keywords are parsed from metadata for the traversed one or more further destination web pages.

13. The computer program product of claim 11, wherein the method further comprises:

retrieving one or more new sitemaps from the further destination web pages; and utilizing the one or more new sitemaps to locate the new link to the web page.

14. A computer system utilizing a computing device for automatically locating a link to a target web page whose link from a referring web page is broken, the computer system comprising:

one or more computer processors;

one or more computer-readable storage media;

program instructions stored on the computer-readable storage media for execution by at least one of the one or more processors, the program instructions comprising:

program instructions to receive via a user input at a computing device a request to access a link to a target web page, wherein the link is from a referring web page being displayed to the user of the computing device;

program instructions to receive by the computing device a notification that the link to the target web page is broken in response to attempting to access the target web page;

program instruction to, based on receiving the notification that the link to the target web page is broken:

determine by the computing device whether a search page for a site hosting the referring web page is present;

access, by the computing device, a sitemap for the site hosting the referring web page, the sitemap providing a list of pages available or previously available on a web server hosting the site;

traverse, by the computing device, one or more pages listed in the sitemap;

scan, by the computing device, automatically for one or more further destination web pages linked-to from the traversed one or more web pages listed in the sitemap, the one or more further destination web pages not listed in the site map;

traverse, by the computing device, automatically the one or more further destination web pages scanned and parse one or more keywords from the one or more further destination web pages;

access a page name for the target web page;

compare, by the computing device, the parsed one or more keywords from the further destination web pages with the accessed page name to locate the new link to the web page, the comparing performed by comparing the one or more parsed new keywords with the retrieved page name using a best-fit analysis;

generate, by the computing device, a list of prioritized results via the best-fit analysis; and provide access via the computing device to the user of the computing device to the result which is most likely to link to the broken target web page of the prioritized results located via the best-fit analysis.

* * * * *